United States Patent [19]
Huang et al.

[11] Patent Number: 5,970,031
[45] Date of Patent: Oct. 19, 1999

[54] COMPACT DISC PLAYER SYSTEM WITH VIBRATION-IMMUNE INTERRUPTED PLAYBACK CAPABILITY

[75] Inventors: Wei-Hung Huang, Miaoli Hsien; Ho-Chi Kwong, Hsinchu, both of Taiwan

[73] Assignee: United Microelectronics, Corp., Taiwan

[21] Appl. No.: 08/970,095

[22] Filed: Nov. 13, 1997

[30] Foreign Application Priority Data

Sep. 23, 1997 [TW] Taiwan ................................. 86113777

[51] Int. Cl.$^6$ ........................................................ G11B 7/00
[52] U.S. Cl. .......................................... 369/44.28; 369/54
[58] Field of Search ................................. 369/60, 59, 48, 369/54, 58, 44.28

[56] References Cited

U.S. PATENT DOCUMENTS

| | | | |
|---|---|---|---|
| 5,323,367 | 6/1994 | Tamura et al. | 369/60 |
| 5,502,703 | 3/1996 | Yamada et al. | 369/60 |
| 5,541,901 | 7/1996 | Okamoto et al. | 369/60 |
| 5,608,698 | 3/1997 | Yamanoi et al. | 369/60 |
| 5,677,901 | 10/1997 | Iwamura | 369/60 |
| 5,694,383 | 12/1997 | Arataki et al. | 369/60 |
| 5,740,140 | 4/1998 | Arataki et al. | 369/60 |
| 5,748,585 | 5/1998 | Tsukamoto et al. | 369/60 |
| 5,768,235 | 6/1998 | Huber | 369/60 |
| 5,793,724 | 8/1998 | Ichikawa et al. | 369/60 |

*Primary Examiner*—Nabil Hindi
*Attorney, Agent, or Firm*—Rabin & Champagne, P.C.

[57] ABSTRACT

A CD player system with vibration-immune uninterrupted playback capability is provided, which can keep the playback of the audio or video from an optical disc to be uninterrupted even if in the event of external vibrations causing an interrupt to the data reading operation on the optical disc due to defocusing and mistracking of the laser pickup head of the CD player system. The CD player system has a laser pickup head for reading data from an optical disc; servo circuit for controlling said laser pickup head; data processor for decoding the data from said laser pickup head; memory circuit for temporary storage of the output data from said data processor; microcontroller for controlling operations of said servo circuit and said data processor; audio reproduction components for reproducing the output data from said data processing means. Further, the data processor includes a RAM & time controller coupled to said memory unit and said microcontroller. In the event of the occurrence of a defocusing or mistracking condition to said laser pickup head, said servo circuit informs said microcontroller of such a condition, causing said mirocontroller to fetch information about which data frame is being currently written into said memory unit and then command said memory unit to discard the data frame and also command said servo circuit to resume the data reading operation by positioning the laser pickup head at the data frame that precedes the discarded data frame.

10 Claims, 5 Drawing Sheets

COMPACT DISC PLAYER SYSTEM WITH VIBRATION-IMMUNE INTERRUPTED PLAYBACK CAPABILITY

BACKGROUND OF THE INVENTION

1. Field of the Invention

This invention relates to compact disc (CD) player systems, and more particularly, to a CD player system with vibration-immune uninterrupted playback capability that can prevent interrupt in the audio or video playback in the event of the occurrence of any external vibrations that cause an interrupt in the data reading operation on the optical disc due to defocusing and mistracking of the laser pickup head of the CD player system.

2. Description of Related Art

A CD (compact disc) is an optical disc used to store digital information, such as audio, video, or computer programs and data, characterized in the large storage capacity compared to conventional magnetic storage means. The data stored on a CD can be read out by a laser pickup means. When used to store computer programs and data, it is usually referred to as a CD-ROM (compact-disc read-only-memory). A CD-ROM drive is an input device for personal computers which can handle various kinds of CDs, including video CDs, audio CDs, and CD-ROMs, while a CD player is a electronic device that is capable of reproducing audios from an audio CD.

In the use of a CD-ROM, it is only required that the computer programs or data on the CD-ROM be read out and loaded into the memory of the computer quickly. A short interrupt to the data reading operation on the disc is usually unperceivable by the user. However, in the use of a CD player for playback of audio data, such as musical pieces, a short interrupt to the data reading operation on the disc may cause an interrupt to the audio playback, which is usually intolerable to music lovers.

Interrupts to the data reading operation on the optical disc are usually caused by external vibrations, in that external vibrations can cause jumps—and thereby defocusing and mistracking—to the laser pickup head used for data reading operation on the optical disc. In the case of reading a CD-ROM, such interrupts will only cause a slightly prolonged access time and nothing to the integrity of the programs or data being read out.

In the case of reading an audio or video CD, however, such interrupts will cause intermittent breaks in the continuity of the audio or video playback, which is very unpleasing to the watching eyes and listening ears. This drawback is particularly apparent for CD player systems which are installed on automobiles, in that a running automobile can cause large vibrations to the CD player systems.

One solution to the foregoing problem is to provide a memory buffer to the CD player system. All the playable audio data will be first forwarded to and stored in this memory buffer before they are forwarded to the audio reproduction means. During the time of the occurrence of an interrupt to the data reading operation on the optical disc caused by a defocusing or mistracking of the laser pickup head due to external vibrations, the current contents in the memory buffer can be still used for playback for a short time until the laser pickup head resumes the data reading operation. The following will give a pictorial description of the foregoing conventional CD player systems and their drawbacks in more details.

FIG. 1 shows a schematic block diagram of a typical conventional CD player system used for playback of an optical disc 10. This CD player system includes a spindle motor 20, a laser pickup head 30, a radio frequency (RF) amplifier 40, a servo circuit 50, a data processor 60, a microcontroller 70, a digital-to-analog (D/A) converter 80, an amplifier 90, and a loudspeaker 100. The spindle motor 20 is used to spin the optical disc 10 at a fixed speed during playback operation to allow the data stored on the optical disc 10 to be read out by the laser pickup head 30.

The data signal from the laser pickup head 30 is first amplified by the RF amplifier 40. The output of the RF amplifier 40 is split into two parts: a first part of the amplified signal is transferred to the servo circuit 50 and a second part of the same is transferred to the data processor 60. The signal transferred to the servo circuit 50 is used for feedback controls of both the speed of the spindle motor 20 and the focusing and tracking of the laser pickup head 30. These feedback controls are conventional techniques well known in the art and not within the spirit of the invention, so details thereof will not be further described herein.

The amplified signal transferred to the data processor 60 then undergoes various data processing stages, such as eight-to-fourteen modulation (EFM) decoding, subcode acquisition, error correction and detection (ECD), and so on, to thereby obtain the playable audio data. Since the playable audio data are in digital form, they are further converted by the D/A converter 80 into analog form. The output of the D/A converter 80 is then amplified by the amplifier 90 for audible reproduction by the loudspeaker 100. Moreover, the microcontroller 70 can accept external commands from the user for various controls of the playback.

In the CD player system of FIG. 1, the laser pickup head 30 is a mechanical component which can be easily subjected to external vibrations that would cause defocusing and mistracking to the laser pickup head 30. Should this happen, the data reading operation on the optical disc is interrupted, thus causing an interrupt to the audio playback. This drawback is particularly apparent for CD player systems installed on automobiles which would cause large vibrations when running.

FIG. 2 shows a solution to the foregoing problem, in which an additional RAM unit 110 is coupled to the data processor 60 in the CD player system of FIG. 1. In the CD player system of FIG. 2, all the output data from the data processor 60 will be first forwarded to the RAM unit 110 and temporarily stored therein before they are forwarded to the audio reproduction means (the D/A converter 80, the amplifier 90, and the loudspeaker 100). In the event that the data reading operation on the optical disc 10 by the laser pickup head 30 is interrupted due to external vibrations, the current contents in the RAM unit 110 can be supplied to the audio reproduction means for uninterrupted playback until the laser pickup head 30 resumes data reading operation. By using this solution, however, it is required that the RAM unit 110 be always filled with enough playable audio data from the data processor 60 that can be fetched for playback during the period the data reading operation on the optical disc 10 is interrupted. The microcontroller 70 will command the spindle motor 20 to speed up the spinning of the optical disc 10 when vibrations occur, and speed down the same when the RAM unit 110 is about to overflow.

Therefore, with the CD player system of FIG. 2, the audio playback would not be interrupted when the CD player system is subjected to external vibrations that cause defocusing and mistracking to the laser pickup head 30 and thereby an interrupt in the data reading operation on the optical disc 10. The microcontroller 70 helps to keep the RAM unit 110 filled with an appropriate "backup" amount of playable audio data by controlling the speed of the spindle motor 20.

In the foregoing CD player system of FIG. 2, it is required that, after an interrupt has occurred, the resumed data reading operation start from the interrupted point (i.e., the next byte of audio data following the last byte that has been successfully read out just before the interrupt occurs).

Related patents of CD player systems include the U.S. Pat. No. 5,379,284 "COMPACT DISC PLAYER HAVING AN INTERMEDIATE MEMORY STORAGE DEVICE" to D. G. King, which uses an intermediate memory storage device to keep the audio playback uninterrupted in the event of the CD player system being subjected to external vibrations. Moreover, the U.S. Pat. No. 5,148,417 "TRACKING JUMP COMPENSATOR FOR OPTICAL DISC REPRODUCING APPARATUS" suggests the use of a compensator to keep the audio playback uninterrupted in the event of the CD player system being subjected to external vibrations. These two patents, however, fail to keep the resumed data reading operation to start precisely from the interrupted point.

To solve the foregoing problem, the U.S. Pat. No. 5,615,194 "DISK REPRODUCING APPARATUS AND METHOD FOR REPRODUCING AN AUDIO SIGNAL AND SUBCODE AT N TIMES NORMAL SPEED FROM A DISK" to I. Kimura discloses an apparatus and method which can achieve the so-called one-to-one correspondence of data on the optical disc to keep the resumed data reading operation after an interrupt has occurred to start precisely from the interrupted point. To achieve uninterrupted playback, the disclosed apparatus stores the audio data and associated subcode in a temporary memory unit and then keeps monitoring the subcode from the EFM encoder.

FIG. 3A is a schematic diagram used to depict a standard data format for storing audio data on an optical disc. As shown, the audio of data of a single musical piece, for example, is divided into a plurality of segments, each of which is preceded with a synchronization code SYNC, as designated by the reference numeral 200, and a subcode, as designated by the reference numeral 210, following the SYNC code 200. Typically, the subcode 210 consists of eight channels, which are usually referred to by the letters P, Q, R, S, T, U, V, and W, respectively. A total of 98 subcodes constitute one data frame.

FIG. 3B is a schematic diagram used to depict the structure of each subcode. As shown, the subcode includes eight channels P, Q, R, S, T, U, V, and W, each of which begins with two specific pieces of code data S0 and S1. FIG. 3C shows the contents of channel Q, which include such data fields as (Min: Sec: Frame) and (A_MIN, A_SEC, A_FRAME) which can help the CD player system to resume the data reading operation on the optical disc, after an interrupt has occurred due to vibrations, to start precisely from the interrupted point. For details of this, please refer to the specification of U.S. Pat. No. 5,615,194.

One drawback to the foregoing patent, however, is that, it requires the temporary memory unit to have a large capacity to store the subcode data in addition to audio data. Moreover, it requires quite a complex hardware circuit to implement. These two drawbacks cause the implementation cost of the patent to be very high.

Conventional solutions to the problem of interrupt in the data reading operation on the optical disc due to external vibrations are thus still unsatisfactory. There exists, therefore, a need for a new CD player system which allows the resumed data reading operation on the optical disc, after an interrupt has occurred due to external vibrations, to start precisely from the interrupted point without losing any bytes of audio data between the newly located byte and the last byte that has been successfully read out just before the interrupt occurs.

SUMMARY OF THE INVENTION

It is therefore an objective of the present invention to provide a CD player system which can keep the data reading operation on the optical disc, after an interrupt has occurred due to vibrations, to start precisely from the interrupted point.

It is another objective of the present invention to provide a CD player system which is simple in hardware structure so that the manufacturing cost thereof is low. In accordance with the foregoing and other objectives of the present invention, a new CD player system with vibration-immune uninterrupted playback capability is provided. The CD player system of the invention includes the following constituent parts: a laser pickup head for reading data from an optical disc; servo means for controlling the laser pickup head, data processing means for decoding the data from the laser pickup head into playable form; memory means for temporary storage of the output data from the data processing means; control means, coupled to the servo means and the data processing means, for controlling operations of the servo means and the data processing means; and reproduction means, coupled to the data processing means, for reproducing the output data from the data processing means.

In the foregoing CD player system, the data processing means includes a RAM & time controller coupled to the memory means and the control means; in the event of the occurrence of a defocusing or mistracking condition to the laser pickup head, the servo means informs the control means of such a condition, causing the control means to fetch information about which data frame is being currently written into the memory means and then commands the memory means to discard the data frame and also commands the servo means to resume the data reading operation by positioning the laser pickup head at the data frame that precedes the discarded data frame.

In another aspect, the invention provides a method for use on a CD player system of the type having a laser pickup head for reading data from an optical disc; servo means for controlling the laser pickup head; data processing means for decoding the data from the laser pickup head into playable form; memory means for temporary storage of the output data from the data processing means; control means, coupled to the servo means and the data processing means, for controlling operations of the servo means and the data processing means; and reproduction means, coupled to the data processing means, for reproducing the output data from the data processing means. The method comprises the following steps: in the event of the occurrence of a defocusing or mistracking condition to the laser pickup head, activating the servo means to inform the control means of such a condition; activating the control means to fetch the information about which data frame is currently being written into the memory means; activating the control means to discard the current data frame; activating the control means to command the servo means to resume the data reading operation by positioning the laser pickup head at the previous one of the data frame; and restarting the data reading operation on the optical disc.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
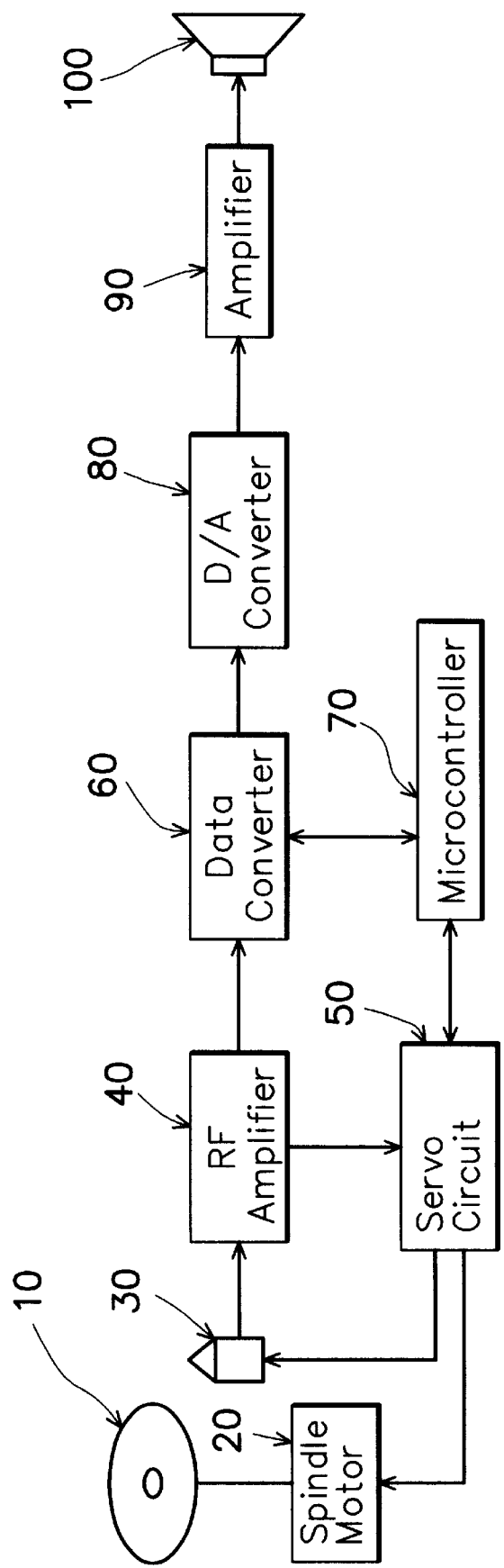
FIG. 1 is a schematic block diagram of a typical conventional CD player system.
Figure 2:
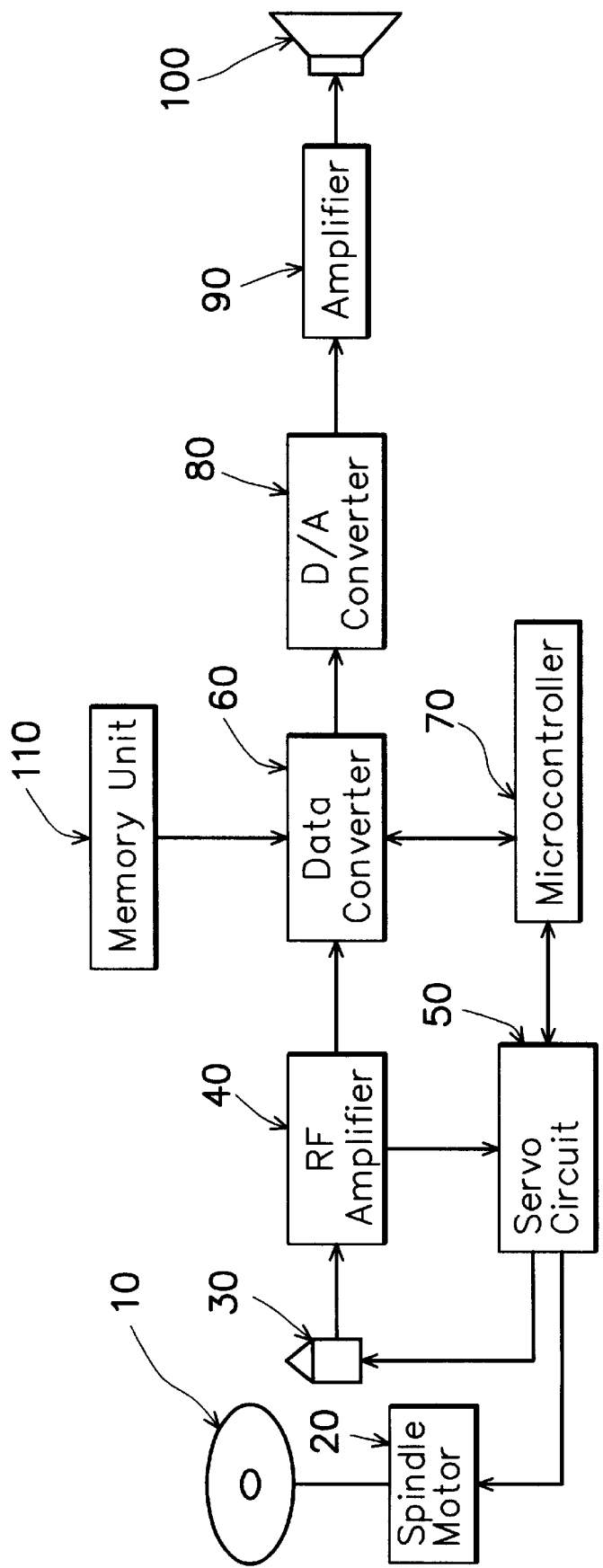
FIG. 2 is a schematic block diagram of the a conventional CD player system which is capable of preventing interrupt in playback.
Figure 3A:
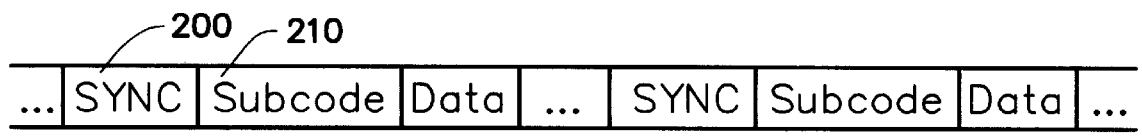
FIG. 3A is a schematic diagram used to depict a standard data format for storing audio data on an optical disc.
Figure 3B:
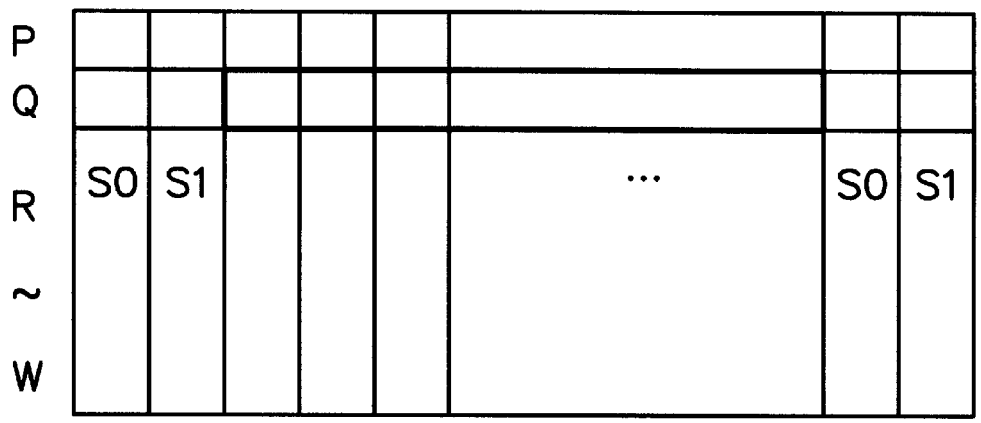
FIG. 3B is a schematic diagram used to depict the structure of each subcode in each data frame on an audio CD.
Figure 3C:
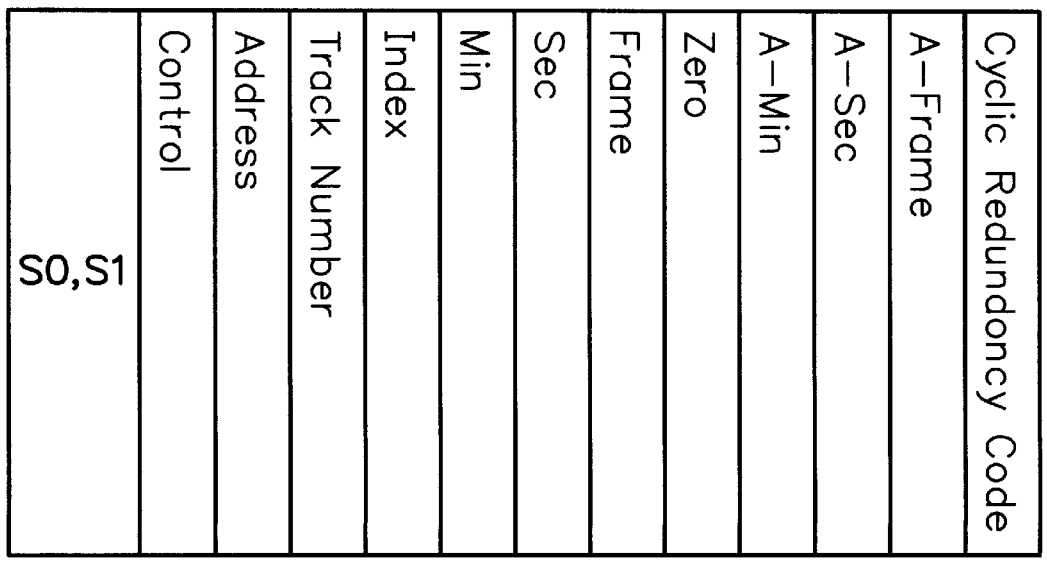
FIG. 3C shows the contents of channel-Q of a subcode.

The invention represents an improvement on the CD player system of FIG. 2. Therefore, The CD player system of the invention has the same block structure as that shown in FIG. 2 but differs in that the data processor in the CD player system of the invention, here labeled with the reference numeral 300 is structured in a different manner in accordance with the invention as shown in FIG. 4.

Figure 4:
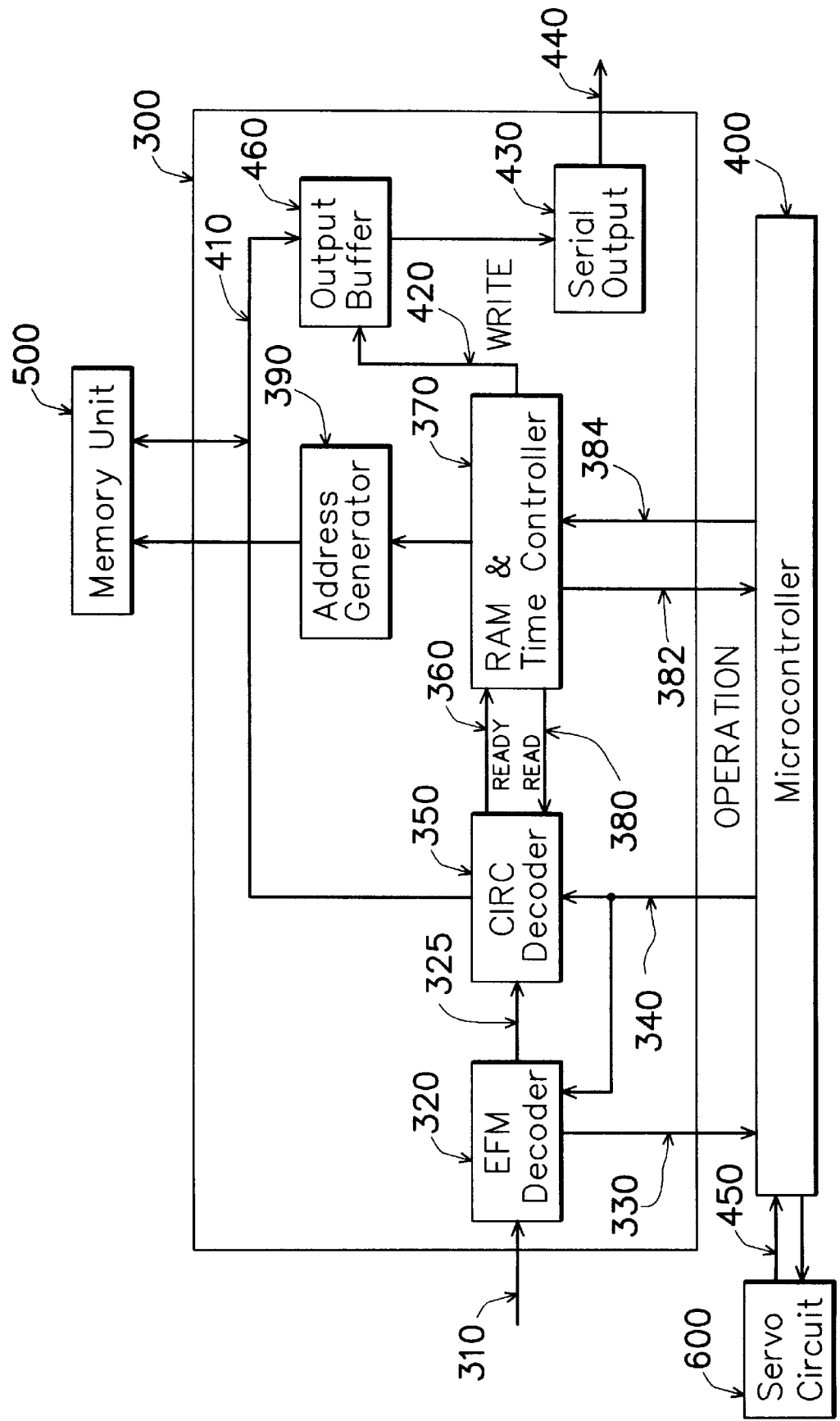
FIG. 4 is a schematic block diagram of the CD player system of the invention.

Referring to FIG. 4, in addition to a spindle motor, a laser pickup head, a D/A converter, an amplifier, and a loudspeaker (see FIG. 2), the CD player system of the invention includes a data processor 300 coupled between the RF amplifier and the D/A converter, a microcontroller 400, a RAM unit 500, and a servo circuit 600 connected to the spindle motor used to spin an optical disc. In more detail, the data processing circuit 300 includes an EFM decoder 320, a CIRC (cross-interleaved Reed-Solomon code) decoder 350, a RAM & time controller 370, an address generator 390, an output buffer 460, and a serial output 430.

The output of the RF amplifier (see FIG. 2) is transferred to the EFM decoder 320 via the signal line 310. The EFM decoder 320 is coupled via the signal line 325 to the CIRC decoder 350 and via the signal lines 330, 340 to the microcontroller 400. Under control by the microcontroller 400, the EFM decoder 320 performs an EFM encoding process on the received signal via the signal line 310 from the RF amplifier (see FIG. 2). The output of the EFM decoder 320 is then transferred via the signal line 325 to the CIRC decoder 350 where a CIRC decoding process is performed on the output of the EFM decoder 320. The CIRC decoder 350 is coupled via the signal lines 360, 380 to the RAM & time controller 370, via the signal line 340 to the microcontroller 400, and via the data bus 410 to both the RAM unit 500 and the output buffer 460.

The decoded output of the CIRC decoder 350 is transferred via the data bus 410 to the RAM unit 500 to be stored temporarily therein. During normal operations when the CD player system is subjected to no external vibrations, the data from the optical disc is transferred smoothly to the data processor 300 and processed therein to obtain playable audio data which are then transferred to the RAM unit 500. The playable audio data in the RAM unit 500 are transferred from the RAM unit 500 to the output buffer 460 to be output via the serial output 430 to the audio reproduction means (which includes a D/A converter, an amplifier, and a loudspeaker as those shown in FIG. 2). In the event of the occurrence of external vibrations that cause an interrupt to the data reading operation on the optical disc, resulting in the EFM decoder 320 receiving no signals via the signal line 310, the current contents in the RAM unit 500, which are the audio data that have been successfully read out from the optical disc just before the interrupt occurs, still can be transferred via the output buffer 460 and serial output 430 to the audio reproduction means for uninterrupted playback. The foregoing scheme to keep uninterrupted playback when the data reading operation on the optical disc is being interrupted is the same as the prior art of FIG. 2. It is a characteristic part of the invention that, after the laser pickup head resumes normal data reading operation, the starting byte is precisely the one that follows the last byte of the last complete frame that has been successfully read out and stored into the RAM unit 500 before the interrupt occurs.

The RAM & time controller 370 is coupled via the signal lines 382, 384 to the microcontroller 400, via the signal lines 360, 380 to the CIRC decoder 350, and via the signal line 420 to the output buffer 460. The RAM & time controller 370 is under control by the microcontroller 400 to instruct the CIRC decoder 350 to perform the CIRC decoding process, and also to enable the output buffer 460 to output data to the serial output 430.

The microcontroller 400 is used to supervise the various operations of the CD player system and also used to control the servo circuit 600 for speed adjustment of the spindle motor to spin the optical disc at various speeds.

The microcontroller 400 also controls the various operations of the data processor 300 to process the output of the RF amplifier received via the signal line 310. Through the EFM decoding process by the EFM decoder 320 and subsequently the CIRC decoding process by the CIRC decoder 350, the received signal can be transformed into playable audio data which is then transferred via the data bus 410 to the RAM unit 500.

During a playback operation, the RF signal from the RF amplifier (see FIG. 2) is processed by the EFM decoder 320 to obtain the channel-Q data of the subcode. This data is then transferred via the signal line 330 to the microcontroller 400. In response, the microcontroller 400 issues an operation enable signal OPERATION via the signal line 340 to both the EFM decoder 320 and the CIRC decoder 350.

In the absence of the OPERATION signal, the CIRC decoder 350 is disabled to receive the output of the EFM decoder 320. In the presence of the OPERATION signal (which is a high-voltage signal), the EFM decoder 320 is enabled in such a manner that it will hold the transfer of its output to the CIRC decoder 350 until the data frame containing a subcode S0 is received.

Whenever the CIRC decoder 350 completes the decoding process, it issues a READY signal via the signal line 360 to the RAM & time controller 370. When data has been fetched away, the RAM & time controller 370 issues a READ signal via the signal line 380 to the CIRC decoder 350. Meanwhile, the RAM & time controller 370 enables the address generator 390 to generate an address signal to the RAM unit 500, allowing the output data from the CIRC decoder 350, which is put on the data bus 410, to be written into the corresponding address in the RAM unit 500.

During playback operation, the RAM & time controller 370 issues a WRITE signal at a fixed rate via the signal line 420 to the output buffer 460, enabling the output buffer 460 to fetch data on the data bus 410. The output of the output buffer 460 is converted by the serial output 430 into a serial sequence of bits which are then transferred via the data line 440 to the audio reproduction means.

In the event of the occurrence of external vibrations which cause defocusing and mistracking to the laser pickup head during the playback operation, the servo circuit 600 will issue a notifying signal via the signal line 450 to the microcontroller 400. In response, the microcontroller 400 switches the OPERATION signal on the signal line 340 to a low-voltage state. At this time the RAM & time controller 370 fetches the information about which data frame is currently being written into the RAM unit 500. The mirocontroller 400 then fetches this information from the RAM & time controller 370, and then commands the RAM & time controller 370 to abandon the current data frame. Meanwhile, the microcontroller 400 commands the servo circuit 600 to try to resume the focusing and tracking of the laser pickup head in such a manner as to reposition the laser pickup head precisely at the data frame preceding the abandoned one. As the laser pickup head has achieved this, the microcontroller 400 then switches the OPERATION signal on the signal line 340 to a high-voltage state so as to resume the data reading operation.

The RAM & time controller 370 is not required to keep monitoring on the subcode data from the EFM decoder 320. After an interrupt has occurred, the microcontroller 400 will inform the RAM & time controller 370 that the subsequently received data is from the newly started byte and also transfer the subcode of the newly picked data to the same. Thereafter, the RAM & time controller 370 will operate independently to check and register the amount of data that has been received from the CIRC decoder 350. As each data frame is received (in compliance with the IEC 908 standard, each frame of audio data includes 2,352 bytes), the RAM & time controller 370 adds the channel-Q code in the subcode forward by one to thereby determine which frame the current output data from the CIRC decoder 350 belongs to.

In addition, the RAM & time controller 370 can inform the microcontroller 400 of the overflow status of the RAM unit 500. In response, the microcontroller 400 controls the servo circuit 600 to adjust the spinning speed of the optical disc such that the access speed can be adjusted to suitable levels that allow the RAM unit 500 to be loaded with adequate amount of playable audio data.

Figure 5:
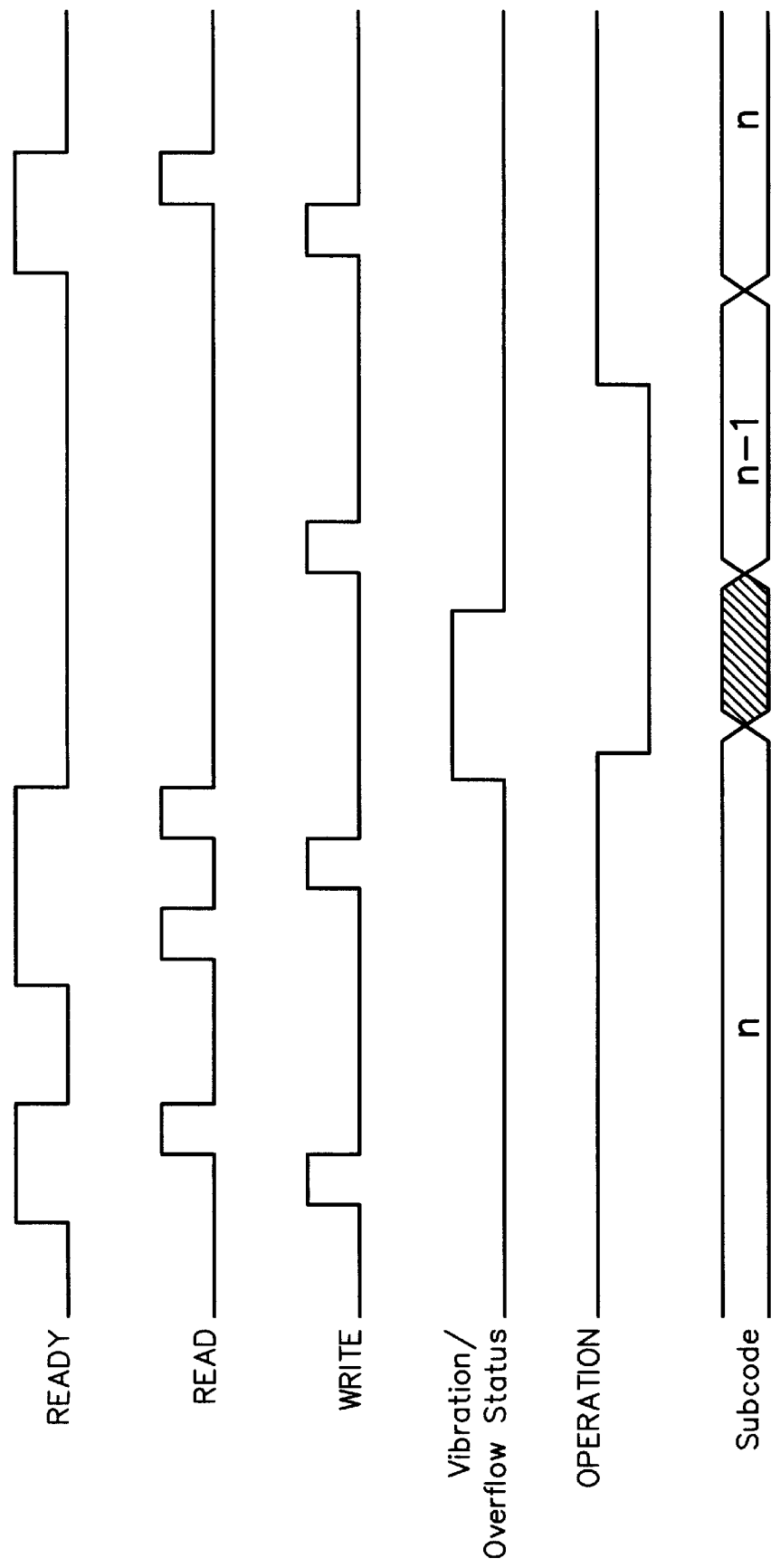
FIG. 5 is a waveform diagram showing the timing relationships between various signals used in the CD player system of FIG. 4.

FIG. 5 is a waveform diagram showing the timing relationships between the various signals used in the CD player system of FIG. 4. As shown, the RAM & time controller 370 switches the READ signal on the signal line 380 to a high-voltage state when the CIRC decoder 350 switches the READY signal on the signal line 360 to a high-voltage state, allowing the output data from the CIRC decoder 350 to be written into the RAM unit 500. The WRITE signal on the signal line 420 generated by the RAM & time controller 370 is a pulse train of a fixed rate.

In the event of the occurrence of a vibration condition to the laser pickup head or an overflow condition to the RAM unit 500, it will cause the VIBRATION/OVERFLOW status signal to be triggered into a high-voltage state. In response to this, the microcontroller 400 will switch the OPERATION signal to a low-voltage state so as to disable the transfer of data from the EFM decoder 320 to the CIRC decoder 350 and also to reset the CIRC decoder 350. Assume that at the instant of the occurrence of this interrupt, the data frame that is currently being written into the RAM unit 500 is the (n)th one. In response to this information, the microcontroller 400 commands the servo circuit 600 to search for the (n−1)th data frame and then position the laser pickup head 30 at this data frame to restart the data reading operation. Meanwhile, the OPERATION signal is switched back to the high-voltage state, thereby enabling the EFM decoder 320 and CIRC decoder 350 to resume operation. Until the subcode of S0 is received by the EFM decoder 320, the subsequent audio data is then decoded and transferred to the RAM unit 500, thus maintaining the continuity of the audio playback.

In conclusion, the CD player system of the invention can achieve the objectives of keeping the data reading operation on the optical disc, after an interrupt has occurred due to vibrations, to start precisely from the interrupted point, and which is simple in hardware structure so that the manufacturing cost thereof is low.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A CD player system with vibration-immune uninterrupted playback capability, which comprises:

laser pickup head for reading data from an optical disc that is an audio CD containing audio data thereon;

servo means for controlling said laser pickup head;

data processing means for decoding the data from said laser pickup head into playable form;

memory means for temporary storage of the output data from said data processing means;

control means, coupled to said servo means and said data processing means, for controlling operations of said servo means and said data processing means; and reproduction means, coupled to said data processing means, for reproducing the output data from said data processing means;

wherein said data processing means includes:

a RAM & time controller coupled to said memory means and said control means;

an EFM decoder from performing an EFM decoding process on the data read from said optical disc;

a CIRC decoder, coupled to said RAM & time controller, for performing a CIRC decoding process on the output data from said EFM decoder;

an address generator, coupled to said RAM & time controller, for generating an address signal to said memory means; and output means, under control by said RAM & time controller, for outputting data from said memory means to said reproduction means;

wherein in the event of the occurrence of a defocusing or mistracking condition to said laser pickup head, said servo means informing said control means of such a condition, causing said control means to fetch information about which data frame is being currently written into said memory means and then command said memory means to discard the data frame and also command said servo means to resume the data reading operation by positioning said laser pickup head at the data frame that precedes the discarded data frame, and wherein in the event of the occurrence of a defocusing or mistracking condition to said laser pickup head, said control means performs the steps of: disabling said EFM encoder; resetting said CIRC decoder; fetching the information about which data frame is currently being written into said memory means; commanding said servo means to resume the data reading operation by positioning the laser pickup head at the previous one of the data frame; and enabling said EFM decoder to restart the EFM decoding process when the next subcode appears.

2. The CD play system of claim 1, wherein said specified subcode S0 subcode defined by a data format of an audio CD.

3. The CD play system of claim 1, wherein said control means comprise a microcontroller.

4. The CD play system of claim 1, wherein said control means comprises a microprocessor.

5. The CD player system of claim 1, wherein said control means comprises:
   a D/A converter for converting the digital output from said data processor into analog form;
   an amplifier for amplifying the analog output of D/A converter; and
   a loudspeaker for reproducing the analog output of said amplifier into audible form.

6. A method for use on a CD player system of the type having a laser pickup head for reading data from an optical disc that is an audio CD containing audio data thereon, servo means for controlling said laser pickup head; data processing means for decoding the data from said laser pickup head into playable form; memory means for temporary storage of the output data from said data processing means; control means, coupled to said servo means and said data processing means, for controlling operations of said servo means and said data processing means; and reproduction means, coupled to said data processing means, for reproducing the output data from said data processing means; wherein the data processing means includes:
   an EFM decoder for performing an EFM decoding process on the data read from the optical disc;
   a CIRC decoder, coupled to a RAM & time controller, for performing a CIRC decoding process on the output data from said EFM decoder;
   an address generator, coupled to said RAM & time controller, for generating an address signal to said memory means; and
   output means, under control by said RAM & time controller, for outputting data from said memory means to said reproduction means; said method comprising the steps of:
   in the event of the occurrence of a defocusing or mistracking condition to said laser pickup head, activating said servo means to inform said control means of such a condition;
   activating said control means to fetch the information about which data frame is currently being written into said memory means;
   activating said control means to discard the current data frame;
   activating said control means to command said servo means to resume the data reading operation by positioning the laser pickup head at the previous one of the data frame; and
   restarting the data reading operation on the optical disc,
   wherein in the event of the occurrence of a defocusing or mistracking condition to said laser pickup head, said control means performs the steps of: disabling said EFM encoder; resetting said CIRC decoder; fetching the information about which data frame is currently being written into said memory means; commanding said servo means to resume the data reading operation by positioning the laser pickup head at the previous one of the data frame; and enabling said EFM decoder to restart the EFM decoding process when the next subcode appears.

7. The method of claim 6, wherein said specified subcode is the S0 subcode defined by a data format of an audio CD.

8. The method of claim 6, wherein said control means comprises a microcontroller.

9. The method of claim 6, wherein said control means comprises a microprocessor.

10. The method of claim 6, wherein said audio reproduction means comprises:
    a D/A converter for converting the digital output from said data processor into analog form;
    an amplifier for amplifying the analog output of said D/A converter; and
    a loudspeaker for reproducing the analog output of said amplifier into audible form.

* * * * *